(12) United States Patent
Dion et al.

(10) Patent No.: US 9,379,592 B2
(45) Date of Patent: Jun. 28, 2016

(54) ACTUATOR FOR A FLAP FOR OPENING AND CLOSING AN AIR PASSAGE

(75) Inventors: Nathalie Dion, Buc (FR); Romain Barbeau, Rambouillet (FR)

(73) Assignee: VALEO SYSTEMES THERMIQUES, Le Mensil Saint Denis (FR)

( * ) Notice: Subject to any disclaimer, the term of this patent is extended or adjusted under 35 U.S.C. 154(b) by 547 days.

(21) Appl. No.: 13/981,701

(22) PCT Filed: Jan. 25, 2012

(86) PCT No.: PCT/EP2012/051154
§ 371 (c)(1),
(2), (4) Date: Oct. 11, 2013

(87) PCT Pub. No.: WO2012/101179
PCT Pub. Date: Aug. 2, 2012

(65) Prior Publication Data
US 2014/0028120 A1      Jan. 30, 2014

(30) Foreign Application Priority Data

Jan. 25, 2011   (FR) ..................................... 11 00209

(51) Int. Cl.
*H02K 1/04*       (2006.01)
*H02K 7/116*      (2006.01)
*B60H 1/00*       (2006.01)
*H02K 7/08*       (2006.01)

(52) U.S. Cl.
CPC ............ *H02K 7/116* (2013.01); *B60H 1/00857* (2013.01); *H02K 7/081* (2013.01)

(58) Field of Classification Search
CPC ...... H02K 7/116; H02K 7/081; B60H 1/00871
USPC ..................................... 310/43, 51, 71, 83, 90
See application file for complete search history.

(56) References Cited

U.S. PATENT DOCUMENTS

| | | | | |
|---|---|---|---|---|
| 1,469,424 A | * | 10/1923 | McQuaid | F16C 17/08 384/610 |
| 2,233,525 A | * | 3/1941 | Guptail | A01K 89/015 184/89 |
| 3,816,782 A | * | 6/1974 | Dow | F16C 17/04 310/90 |

(Continued)

FOREIGN PATENT DOCUMENTS

| EP | 0998013 A1 | 5/2000 |
|---|---|---|
| FR | 2661958 A1 | 11/1991 |
| FR | 2708159 A1 | 1/1995 |

OTHER PUBLICATIONS

English language abstract for FR 2661958 extracted from the espacenet.com database on Jan. 23, 2014, 10 page.

(Continued)

*Primary Examiner* — Thanh Lam
(74) *Attorney, Agent, or Firm* — Howard & Howard Attorneys PLLC

(57) ABSTRACT

The invention relates to an actuator for a flap for opening and closing an air passage in an air conditioner, ventilator, and/or heater, comprising a housing (1) shaped to accommodate a motor as well as a gearing arrangement. The actuator is characterized in that the housing (1) includes at least one abutment element (5) for limiting the movement of a rotational shaft (3) with respect to the casing of the motor, as well as a means (6) for compensating for a space between the abutment element (5) and a free end of the rotational shaft (3).

16 Claims, 1 Drawing Sheet

(56) References Cited

U.S. PATENT DOCUMENTS

Figure 1:
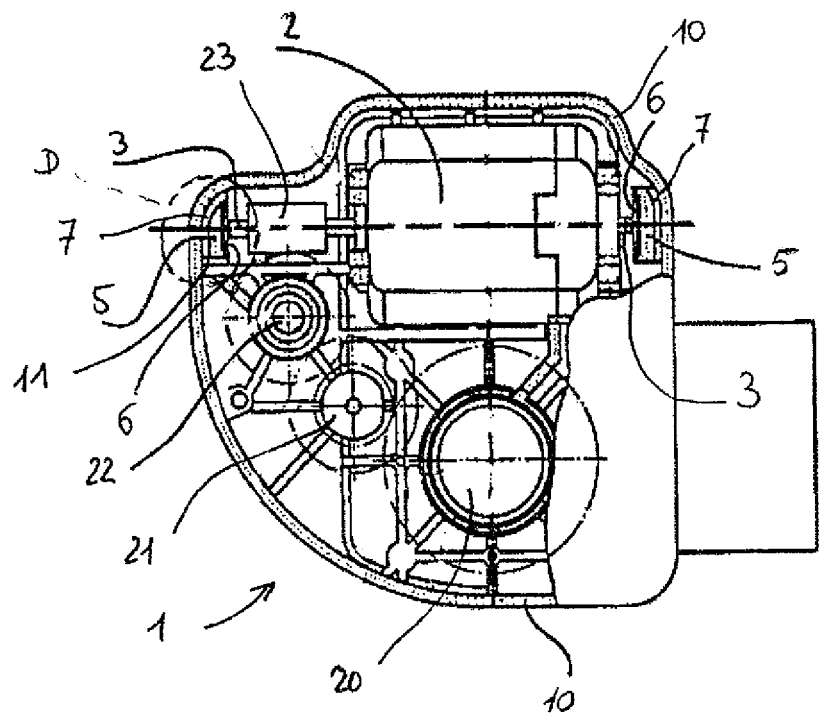

| | | | |
|---|---|---|---|
| 5,169,245 A | 12/1992 | Harada et al. | |
| 6,698,933 B2 * | 3/2004 | Lau | F16C 17/04 310/90 |
| 2008/0238229 A1 | 10/2008 | Iwashima et al. | |
| 2009/0322171 A1 | 12/2009 | Wei et al. | |
| 2010/0206111 A1 | 8/2010 | Keller et al. | |

OTHER PUBLICATIONS

Machine-assisted English translation for FR 2708159 extracted from the espacenet.com database on Jan. 23, 2014, 20 pages.
International Search Report for Application No. PCT/EP2012/021154 dated May 22, 2012, 7 pages.

* cited by examiner

ACTUATOR FOR A FLAP FOR OPENING AND CLOSING AN AIR PASSAGE

RELATED APPLICATIONS

This application is the National Stage of International Patent Application No. PCT/EP2012/051154, filed on Jan. 25, 2012, which claims priority to and all the advantages of French Patent Application No. FR 11/00209, filed on Jan. 25, 2011, the content of which is incorporated herein by reference.

The present invention relates to an actuator for a flap comprising means of suppressing the operating noise.

The present invention relates more particularly to an actuator for a flap for opening and closing an air passage included in an air-conditioning, ventilating and/or heating device, comprising a housing shaped to receive a motor as well as a gearing device.

It is known to use actuators comprising a motor and a drive device, in order to move moveable members between the movement end positions thereof. Such members can, for example, be flaps for opening and closing an air passage conduit formed inside a housing of a ventilating, heating and/or air-conditioning device which is intended to modify the thermal properties of the air of an interior of a vehicle, particularly a motor vehicle. Given the manufacturing tolerances of each of the parts making up the actuator, the drive screw of the motor can travel axially, more particularly when the moveable member reaches one of the movement end positions thereof.

It is known that such a motor is placed in a housing comprising noise-damping means which are formed directly on the housing by an overmolding of plastic that is more flexible than that used in the manufacture of the housing. In this manner, the use of plastics having different hardnesses allows a reduction of the noise coming from the movement of the drive screw which is part of the motor against a stop formed on the housing of the actuator. It is also known to create, inside the housing, a step bearing plate, acting as said stop for receiving a free end of the drive screw.

Therefore, such a motor housing includes at least one step bearing plate, the surface of which is directly against the end of the drive screw which is also made of plastic. Such a solution aims to insulate the step bearing plate of the housing without necessarily eliminating the noise generated by the end of the drive screw pressing on the step bearing plate.

It has been noted that a known solution reduces the noise without necessarily removing the presence thereof, which causes an inconvenience for use during which there is, audibly, the noise resulting from the impact between the end of the worm and the step bearing head.

An aim of the invention is to overcome all or some of the disadvantages of the prior art pointed out above.

To this end, the actuator according to the invention, furthermore in accordance with the generic definition thereof given by the preamble above, is basically innovative in that the housing includes at least one stop element for limiting the movement of a rotating shaft with respect to the casing of the motor, as well as a means of compensating for a space between the stop element and a free end of the rotating shaft.

Furthermore, the actuator, which is the subject matter of the invention, can comprise one or more of the following features:

said means of compensating for a space between the stop element and a free end of the rotating shaft includes a deformable element placed on one of the faces of the stop element extending opposite a free end of the rotating shaft of the servomotor; wherein such a compensation means advantageously allows permanent pressing to be maintained between the end of the rotating shaft of the motor and the element acting as a stop to the axial movement thereof;

it includes a means of suppressing the noise generated by the axial movement of the rotating shaft with respect to the casing of the motor, such a noise-suppressing means comprising at least one damping element placed between the stop element and the housing; wherein such a noise-suppressing means is designed to oppose the axial movement of the rotating shaft with respect to the casing of the motor;

the stop element for limiting the axial movement of the rotating shaft is a wall which is moveable in relation to a peripheral wall of the housing, such that the body of the housing does not have any rigidly connected and deformable part;

the damping element is mechanically similar to a spring and is produced from a deformable plastic, using an operation of overmolding the housing, which is a simple way of designing deformable parts on a rigid housing;

the stop element is made of plastic, using a traditional molding method;

the stop element is a piece attached to the housing, which piece is mounted in a sliding manner along at least one guide rib arranged on the housing extending parallel to the axis for axial movement of the rotating shaft of the motor; such a stop element advantageously allows for easy attachment on any existing housing, without having to modify the manufacturing molds, thus making the modification of the noise absorbing/reducing properties of existing housings possible;

said means of compensating for a space between the stop element and a free end of the rotating shaft is a block made from elastomer and obtained using an operation of overmolding the stop element, which advantageously allows for proceeding simultaneously from the manufacture of the housing to the manufacture of the stop element comprising said noise-suppressing means comprising at least one damping element placed between the stop element and the housing;

the plastic used for manufacturing the damping element has a hardness that is greater than the plastic used for manufacturing the block acting as said means of compensating for a space between the stop element and a free end of the rotating shaft, and the block is preferably an elastomer with a Shore hardness of between 25 and 60;

the free end of the rotating shaft is permanently arranged in a pressing manner on said means of compensating for a space between the stop element and a free end of the rotating shaft, the assembly clearance therefore being rendered nonexistent;

said means of compensating for a space between the stop element and a free end of the rotating shaft is covered with a layer for reducing the coefficient of adhesion for facilitating the rotating movement of the rotating shaft of the motor in relation to the stop element, such a layer allowing a reduction in the energy necessary for rotating the shaft of the motor, therefore being beneficial for the energy used by the latter.

Figure 2:
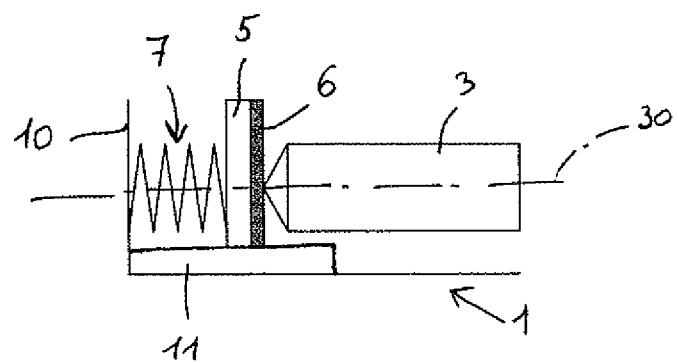

Other advantages and features of the invention will emerge from the description of embodiments which is given hereafter with reference to the appended drawings wherein:

FIG. 1 is a partial sectional view of an actuator allowing the movement of a flap, according to the invention, FIG. 2 is an enlargement of an area D of FIG. 1 schematically showing a means of compensating for a space between the stop element and a free end of the rotating shaft and a means of suppressing the noise generated by the axial movement of the rotating shaft in relation to the casing of the motor.

Referring to FIG. 1, an actuator is shown which allows the movement of a moveable element between the operating end positions thereof. Such a moveable element is, for example, a flap for opening or closing a passage for flow of an air stream in an air-conditioning, ventilating and/or heating device. To this end, the actuator includes a gear motor comprising a motor 2 and a set of gearings 21, 22 and 23 linking the rotating shaft 3 of the motor to a drive shaft 20.

The latter is preferably linked to said flap (not shown) such that the rotation of the drive shaft 20 produces a change in the position of the flap between end positions for opening and closing a passage for flow of an air stream in an air-conditioning, ventilating and/or heating device which has not been shown.

The rotating shaft 3 comprises a worm 23 acting as a driving gear which engages gears, particularly first and second gears 22 and 21. Said second gear 21 acts as a driving gear which engages the drive shaft 20.

The above-mentioned elements are received in a housing 1 of the actuator. The housing 1 includes at least one peripheral wall 10 extending perpendicular to a bottom wall. Such a peripheral wall includes a dedicated accommodation for the motor 2.

The dedicated accommodation for the motor includes supporting means made from deformable material for absorbing the vibrations of the latter during the operation thereof.

According to a preferred embodiment illustrated in FIG. 1, the motor 2 includes a rotating shaft 3 passing through the entire motor casing. The free ends of the rotating shaft 3 extend outside the casing of the motor.

Each of the free ends extend opposite and substantially perpendicular to at least one stop element 5 for limiting the movement of the rotating shaft 3 in relation to the casing of the motor 2.

Preferentially again, said stop element 5 includes a means of compensating for a space between the stop element 5 and the free end of the rotating shaft 3.

Such a means is produced from a deformable element, such as an elastomer, having a Shore hardness of between 25 and 60.

Said deformable element acts as said means of compensating for spaces between the stop element 5 and a free end of the rotating shaft 3. Such spaces are the result of the manufacturing tolerances for the pieces making up the motor 2, the set of gearings 20, 21, 22 and 23, and the housing 1.

Said deformable element acting as said means 6 of compensating for a space between the stop element 5 and a free end of the rotating shaft 3 is placed on one of the faces of the stop element 5.

As shown in FIG. 2, the above-mentioned deformable element is positioned on the stop element, which is also called a step bearing head. The deformable element is a block made from elastomer and obtained using an operation of overmolding the stop element 5.

It is thus placed between the rotating shaft 3 and the stop element 5. Given that the rotating shaft 3 is made from steel and the stop element 5 is made from rigid plastic, the presence of the deformable element made from elastomer advantageously prevents pressing by a steel piece directly on a plastic piece, and significantly reduces premature wear of the plastic piece. Furthermore, this deformable elastomer element helps reduce the noise generated by the rotating shaft 3 pressing on the stop element 5, for example when the motor 2 is starting.

The face of the deformable element on which the free end of the rotating shaft 3 is placed in a pressing manner substantially has a shape that is complementary to the latter.

The deformable element acting as said means 6 of compensating for the spaces is, according to a preferred embodiment, covered with a layer for reducing the coefficient of adhesion. For example, such a layer is made from polytetrafluoroethylene. Such a layer advantageously allows the rotating movement of the shaft 3 to be facilitated in relation to the stop element 5.

The operation of the actuator of the invention is facilitated by the assembly clearances which become, therefore, a requirement but also a source of noise.

This is why the rotating shaft 3 is, in addition to being rotationally moveable, axially moveable. However, to overcome the noise generated during an impact between the rotating shaft and the casing of the motor 2, the actuator of the invention includes a damping element 7 acting as a means of suppressing the noise which is placed between the stop element 5 and the peripheral wall 10 of the housing 1. The damping element 7 is mechanically similar to a spring through the force/travel principle thereof.

According to a preferred embodiment, the damping element is made from deformable plastic using an operation of overmolding the housing 1. Preferably, the plastic used for manufacturing the damping element 7 has a hardness that is greater than the plastic used for manufacturing the block acting as said means 6 of compensating for a space between the stop element 5 and a free end of the shaft 3.

According to an alternative embodiment, the damping element 7 is a deformable metal strip, with a shape substantially in a V along a cross section.

The stop element 5 is a wall that is moveable in relation to a peripheral wall 10 which is intended to limit the axial movement of the rotating shaft 3. Advantageously, the squashing travel of the damping element 7 is less than the travel of the rotating shaft 3 in relation to the motor casing.

The stop element 5 is a piece attached to the housing 1, which piece is mounted in a sliding manner on the bottom of the housing 1. To this end, the housing includes guide ribs 11 along which the stop element 5 can slide. Such ribs extend parallel to the axis 11 for axial movement of the shaft 3.

Advantageously still, the counter-force generated by the damping element 7 is greater than the axial travel force of the rotating shaft 3. The damping element 7 is then deformable when compressed in a direction that is substantially parallel to the rotating axis 30 of the shaft 3. The compression limit is reached before the shaft 3 presses against the casing of the motor, such that the damping element 7 acts, after deformation, as a stop to the axial movement of the shaft 3.

Advantageously, the actuator according to the invention is obtained by a manufacturing method comprising a step of molding the housing 1 which is separate from a step of manufacturing the stop element 5 comprising said means of compensating for a space between the stop element 5 and a free end of the rotating shaft 3.

The method of manufacturing the actuator comprises:
a step of producing the housing 1 using an operation of molding a plastic,
a step of producing each stop element 5 comprising an operation of molding the latter and an operation of overmolding the block acting as said means 6 of compensating for the spaces, such a step being preferably carried out together with the step of producing the housing, a step of positioning each of the stop elements 5 on the housing 1, a step of mounting the motor 2 in a dedicated accommodation arranged in the housing 1, such that each of the free ends of the shaft 3 of the motor press against the block acting as said means 6 of compensating for the spaces.

Said method includes a step of producing each of the damping elements 7 acting as said means of suppressing the operating noise of the motor.

For this purpose, the method of manufacturing the housing preferentially includes a step of overmolding each of the damping elements 7 acting as said means of suppressing the operating noise of the motor on the motor 1.

According to an alternative embodiment of the actuator of the invention, the latter is obtained using a manufacturing method which includes the arrangement of a deformable strip between the peripheral wall 10 of the housing 1 and the stop element 5 previously placed on the housing 1.

The manufacturing method therefore simply allows the quality of the actuator to be improved in terms of the operating noise by adding, to a strict minimum, means for eliminating the noise at the noise-generating source.

Compared to any known solution which does not have a block acting as a means 6 of compensating for the spaces between the shaft 3 and each of the stop elements 5, the operating noise of the actuator is approximately 30% less.

The invention claimed is:

1. An actuator for a flap for opening and closing an air passage included in an air-conditioning, ventilating and/or heating device, the actuator comprising a housing (1) shaped to receive a motor (2) as well as a gearing device (4), wherein the housing (1) includes at least one stop element (5) for limiting the movement of a rotating shaft (3) with respect to the casing of the motor (2), as well as an element (6) of compensating for a space between the stop element (5) and a free end of the rotating shaft (3).

2. The actuator as claimed in claim 1, wherein the element (6) of compensating for a space between the stop element (5) and a free end of the rotating shaft (3) includes a deformable element placed on one of the faces of the stop element (5) extending opposite a free end of the rotating shaft (3) of the motor (2).

3. The actuator as claimed in claim 1, further comprising at least one damping element (7) placed between the stop element (5) and the housing (1) for suppressing the noise generated by the movement of the rotating shaft (3) with respect to the casing of the motor (2).

4. The actuator as claimed in claim 1, wherein the stop element (5) for limiting the axial movement of the rotating shaft (3) is a wall which is moveable in relation to a peripheral wall (10) of the housing (1).

5. The actuator as claimed in claim 3, wherein the damping element (7) is mechanically a spring and is produced from a deformable plastic.

6. The actuator as claimed in claim 1, wherein the stop element (5) is made of plastic.

7. The actuator as claimed in claim 1, wherein the stop element (5) is a piece attached to the housing (1), which piece is mounted in a sliding manner along at least one guide rib (11) arranged on the housing (1) extending parallel to the axis for axial movement of the rotating shaft (3) of the motor (2).

8. The actuator as claimed in claim 1, wherein the element (6) of compensating for a space between the stop element (5) and a free end of the rotating shaft (3) is a block made from elastomer.

9. The actuator as claimed in claim 5, wherein the plastic used for manufacturing the damping element (7) has a hardness that is greater than plastic the element (6) of compensating for a space between the stop element (5) and the free end of the rotating shaft (3).

10. The actuator as claimed in claim 1, wherein the free end of the rotating shaft (3) is permanently placed in a pressing manner on the means (6) of compensating for a space between the stop element (5) and the free end of the rotating shaft (3).

11. The actuator as claimed in claim 1, wherein the means (6) of compensating for a space between the stop element (5) and a free end of the rotating shaft (3) is covered with a layer for reducing the coefficient of adhesion for facilitating the rotating movement of the rotating shaft (3) of the motor (2) in relation to the stop element (5).

12. The actuator as claimed in claim 2, further comprising at least one damping element (7) placed between the stop element (5) and the housing (1) for suppressing the noise generated by the movement of the rotating shaft (3) with respect to the casing of the motor (2).

13. The actuator as claimed in claim 5, wherein the damping element (7) is produced from the deformable plastic using an operation of overmolding the housing.

14. The actuator as claimed in claim 8, wherein the block made from elastomer is obtained using an operation of overmolding the stop element (5).

15. The actuator as claimed in claim 8, wherein the plastic used for manufacturing the damping element (7) has a hardness that is greater than the plastic used for manufacturing the block acting as the element (6) of compensating for a space between the stop element (5) and the free end of the rotating shaft (3).

16. The actuator as claimed in claim 3, wherein the damping element (7) is a deformable metal strip.

* * * * *